United States Patent
Cho

[19]

[11] Patent Number: 6,119,237
[45] Date of Patent: Sep. 12, 2000

[54] METHOD AND APPARATUS FOR REGULATING POWER SUPPLIED FROM A DOCKING STATION TO A PORTABLE COMPUTER

[75] Inventor: Hwan-Cheol Cho, Suwon, Rep. of Korea

[73] Assignee: SamSung Electronics Co., Ltd., Suwon, Rep. of Korea

[21] Appl. No.: 09/116,600

[22] Filed: Jul. 16, 1998

[30] Foreign Application Priority Data

Jul. 16, 1997 [KR] Rep. of Korea ..................... 97-33337

[51] Int. Cl.⁷ ..................................... G06F 1/26
[52] U.S. Cl. ..................... 713/300; 713/340; 710/101; 710/102
[58] Field of Search .................... 713/300, 340, 713/310; 710/101, 100, 102, 103, 62, 11, 14, 8; 361/686, 683

[56] References Cited

U.S. PATENT DOCUMENTS

| | | | |
|---|---|---|---|
| 5,323,291 | 6/1994 | Boyle et al. ........................... | 361/686 |
| 5,377,357 | 12/1994 | Nishigaki et al. ..................... | 710/101 |
| 5,526,493 | 6/1996 | Shu ....................................... | 710/101 |
| 5,721,836 | 2/1998 | Scharnberg et al. .................. | 710/101 |
| 5,764,968 | 6/1998 | Ninomiya .............................. | 713/601 |
| 5,948,074 | 9/1999 | Ninomiya .............................. | 710/2 |

*Primary Examiner*—Ario Etienne
*Attorney, Agent, or Firm*—Robert E. Bushnell, Esq.

[57] ABSTRACT

A docking station that has means for detecting a docked-signal that indicates that a secure electrical connection has been made between the portable computer and docking station. In addition, a locked-signal is also generated to indicate a secure mechanically locked condition once the portable computer is engaged with the docking station. The locked-signal may be generated by a photo coupler, also referred to as a photo-sensor, that is attached to the locking mechanism of the docking station. Furthermore, a power switch on either the docking station or the portable computer can produce a docking-station-power-on-signal or a portable-computer-power-on-signal, respectively. A controller uses all of the inputs to control the power supplied to both the docking station and the portable computer.

20 Claims, 7 Drawing Sheets

METHOD AND APPARATUS FOR REGULATING POWER SUPPLIED FROM A DOCKING STATION TO A PORTABLE COMPUTER

CLAIM OF PRIORITY

This application makes reference to, incorporates the same herein, and claims all rights accruing thereto under 35 U.S.C. §119 through my patent application entitled An Expansion System of Portable Computer With Power Supply Control Function and the Method Thereof earlier filed in the Korean Industrial Property Office on Jul. 16, 1997 and there duly assigned Serial No. 1997/33337.

BACKGROUND OF THE INVENTION

1. Field of the Invention

The present invention relates to expansion systems for portable computers and, more specifically, to an apparatus and a method for controlling the power supply of a docking station used with portable computers.

2. Background Art

Recently, portable computers have become a popular alternative to traditional desktop computers in terms of their movability, simplicity, and various functions. Furthermore, various expansion devices have been developed that enable the portable computer to extend its battery life as well as its multimedia capabilities. This development has been spurred by users' desires to overcome the inherent functional limitations, with respect to size, weight, and battery life, of portable computers. Some common expansion, also referred to as peripheral, devices are, for example, external speakers, external CD-ROM drives, external batteries, or AC adapters. These peripherals can often be incorporated into, or interfaced through, a docking station that is specifically designed for a particular type of portable computer.

Usually, a docking station has a special connector, also referred to as a port replicator, that allows the portable computer to interface with peripheral devices, that are attached to the docking station, such as an external display device, a mouse, a keyboard, or a pair of speakers. The port replicator is coupled to an expansion port that is positioned on the rear side of the portable computer, to allow the electrical and mechanical connection of the portable computer with the docking station. With this connection, the peripheral devices and the portable computer can be integrated to enhance the functionality of the portable computer.

Some docking stations have a locking device that allows the portable computer to be secured to the tray of the docking station either manually or using a motor. Furthermore, a diagnostic device may be added to the docking station for issuing a test signal to the interface port and verifying secure electrical connection between the connectors when the system is powered on. Once the test is finished positively, the docking station continues to supply power with the expansion devices installed therein and with the portable computer through the interface port. Some techniques for engaging a portable computer with a docking station are shown, for example, in U.S. Pat. No. 5,377,357 to Nishigaki entitled Connection State Confirmation System and Method for Expansion Unit, U.S. Pat. No. 5,526,493 to Shu entitled Docking Detection and Suspend Circuit for Portable Computer/Expansion Chassis Docking System, U.S. Pat. No. 5,721,836 to Schamberg entitled Method and Apparatus for Sensing and Changing the State of a Computer Before Connecting the Computer to or disconnecting the Computer and From an Expansion Unit, and U.S. Pat. No. 5 5,323,291 to Boyle entitled Portable Computer and Docking Station Having an Electromechanical Docking/Undocking Mechanism and a Plurality of Cooperatively Interacting Failsafe Mechanisms. While many of the techniques for engaging portable computers with docking stations, including those above, concentrate on controlling the state of the portable computer, the contemporary art lacks a docking station power controller that verifies both electrical engagement, a mechanically locked engagement, and the state of the computer power switch, to maintain a power supply.

In the above-mentioned docking station, a problem arises when the portable computer is insecurely coupled to the docking station and the electrical power is still being supplied by the docking station. An additional problem may occur during use, even when there is a secure electrical connection, when the docking station locking device is accidentally released. This will lead to an insecure mechanical connection between the docking station and the portable computer that can lead to sudden separation of the portable computer. An incomplete electrical connection between the portable computer and the docking station may affect electrical safety, or may cause a system fault in either the docking station or the portable computer that can result in electronic damage or data loss.

As such, I believe that the contemporary art may be improved by providing a docking station apparatus and method for controlling the power of the docking station, that verifies a mechanically locked condition between the docking station and the portable computer, that verifies a satisfactory electrical connection between the docking station and the portable computer, and that monitors the state of the power switch of both the monitor and the docking station.

SUMMARY OF THE INVENTION

Accordingly, it is an object of the present invention to provide an improved apparatus and an improved method for controlling the power supply of a docking station.

It is another object to provide an apparatus and a method for controlling the power supply of a docking station that reduces damage to the internal components of the docking station.

It is still another object to provide an apparatus and a method for controlling the power supply of a docking station that reduces damage to the portable computer and that also reduces data loss.

It is yet another object to provide an apparatus and a method for controlling the power supply of a docking station that verifies the mechanical connection, that verifies the electrical connection, and that monitors the power switches of both the portable computer and the docking station.

To achieve these and other objects, a docking station and a method is provided with a locking mechanism, a controller that verifies a locked mechanical condition, and that monitors the power switch of both the portable computer and the docking station.

The mechanical locking system is enclosed in the chassis of the docking station and connects a portable computer to a docking station. A beam is rotatably mounted at one end on a boss located on the inner surface of the top side of the chassis. A second end of the beam projects through a groove in the side of the chassis to allow a user to easily manipulate the beam. A spring biases the second end of the beam towards the rear of the chassis. A shaft is attached to the beam and extends downward from the beam to engage a plate. The plate has at least two slots that are substantially perpendicular to the front of the chassis. Fasteners are inserted through the slots and secured to bosses to allow the plate to slide forward and back. Two prongs extend from the plate to eccentrically engage two latching members that are pivotally mounted on the inside of the chassis of the docking station. The latching members have torsion springs biasing them into an orientation that secures the portable computer to the chassis of the docking station. Thus, when a user slides the beam towards the front of the chassis, the plate moves forward and rotates the latching members using the two prongs to release the portable computer from the docking station.

In addition, the docking station has a means for a docked-signal that indicates that a secure electrical connection has been made between the portable computer and docking station. This is done A locked-signal is generated to indicate a secure mechanically locked condition. This signal is generated by a photo coupler, also referred to as a photo-sensor, that is attached to the above described locking device. When the knob controlling the locking device is moved into the lock position a locked signal is generated by the photo-sensor that is received by a controller contained in the docking station. Furthermore, a power switch on either the docking station or the portable computer can produce a docking-station-power-on-signal or a portable-computer-power-on-signal, respectively.

A preferable means of producing the docked-signal is accomplished using a signal loop. The signal loop is made up of a first pin, that is maintained at a predetermined voltage and a second pin that is electrically grounded. Both of these pins are located on the docking station near the interface port to allow them to interface with pins on the portable computer. A third pin and a fourth pin are both located on the portable computer and make contact with the pins on the docking station. The third and fourth pins are connected via a wire, thus completing the circuit and reducing the voltage of the first pin to zero when the portable computer is electrically connected to the docking station. When the voltage goes from a high, predetermined voltage, condition to a low, or zero, voltage a docked-signal is detected. A low voltage condition is interpreted by the controller to be a docked-signal.

A preferable means of producing a locked-signal is to use a photo coupler, also referred to as a photo-sensor to send a locked-signal to the controller when the portable computer is securely locked with the docking station. A photo coupler can be positioned adjacent to the extension plate that is attached to the knob controlling the locking device. When the knob is moved into the locked position, the extension plate interrupts the photo coupler generating a locked-signal.

A controller monitors all the signals that can be generated by either the docking station or the portable computer and uses the inputs to determine whether the power to the portable computer and the docking station should be activated. The first criteria for activating the power to the portable computer is that both a locked-signal and a docked-signal must be detected by the controller. This indicates that both a secure electrical connection and a mechanically locked condition exists between the portable computer and the docking station. In addition, for the controller to send a power-on-signal to the power supply, the controller must also detect either a portable-computer-power-on-signal or a docking-station-power-on-signal. Once all of the above conditions are satisfied the controller activates the power supply.

Once the power supply has been activated, the controller continues to monitor the signal inputs to determine whether the power supply to the docking station and the portable computer should be deactivated. If either the docked-signal or the locked-signal is interrupted, then the power supply is deactivated. In addition, if the controller receives a power-off signal from either the portable computer or the docking station, then the controller deactivates the power supply.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
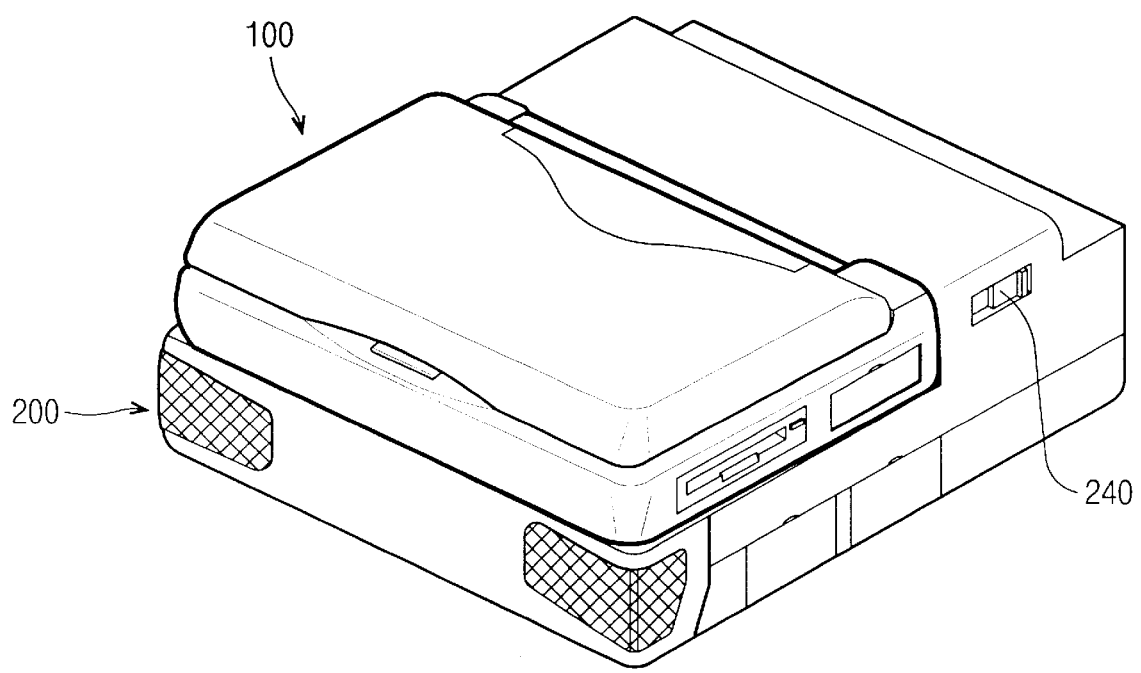
FIG. 1 is a perspective view of a portable computer mounted on a docking station.

Turning now to the drawings, FIG. 1 illustrates a docking station with an attached portable computer 100. The docking station or docking station 200 may include or be interfaced with various expansion devices, such as, a CD-ROM drive, an extra sound card, an extra video card, an pair of speakers, a modem, or an additional battery or AC adapter. Docking station 200 has knob 240 positioned on a side of the housing to mechanically lock or release portable computer 100 from docking station 200.

Figure 2:
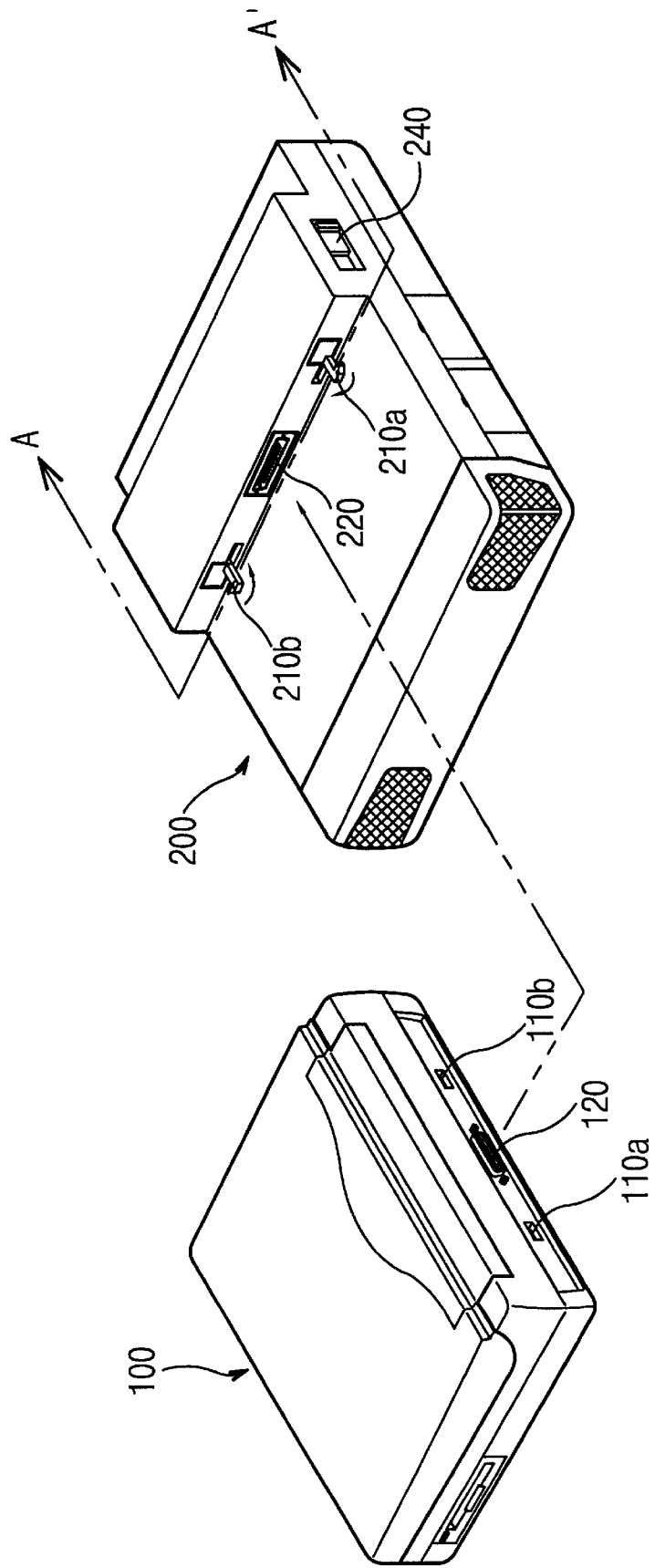
FIG. 2 is a perspective view illustrating the portable computer and the docking station as constructed according to the principles of the present invention in a detached state.

FIG. 2, illustrates a docking station as constructed according to the principles of the present invention with portable computer 100 detached from docking station 200. Latching members 210a and 210b protrude from the docking station to mechanically lock the portable computer into engagement with the docking station. Interface port 220 engages expansion port, or connector, 120 to establish an electrical connection between the portable computer and the docking station.

Figure 3:
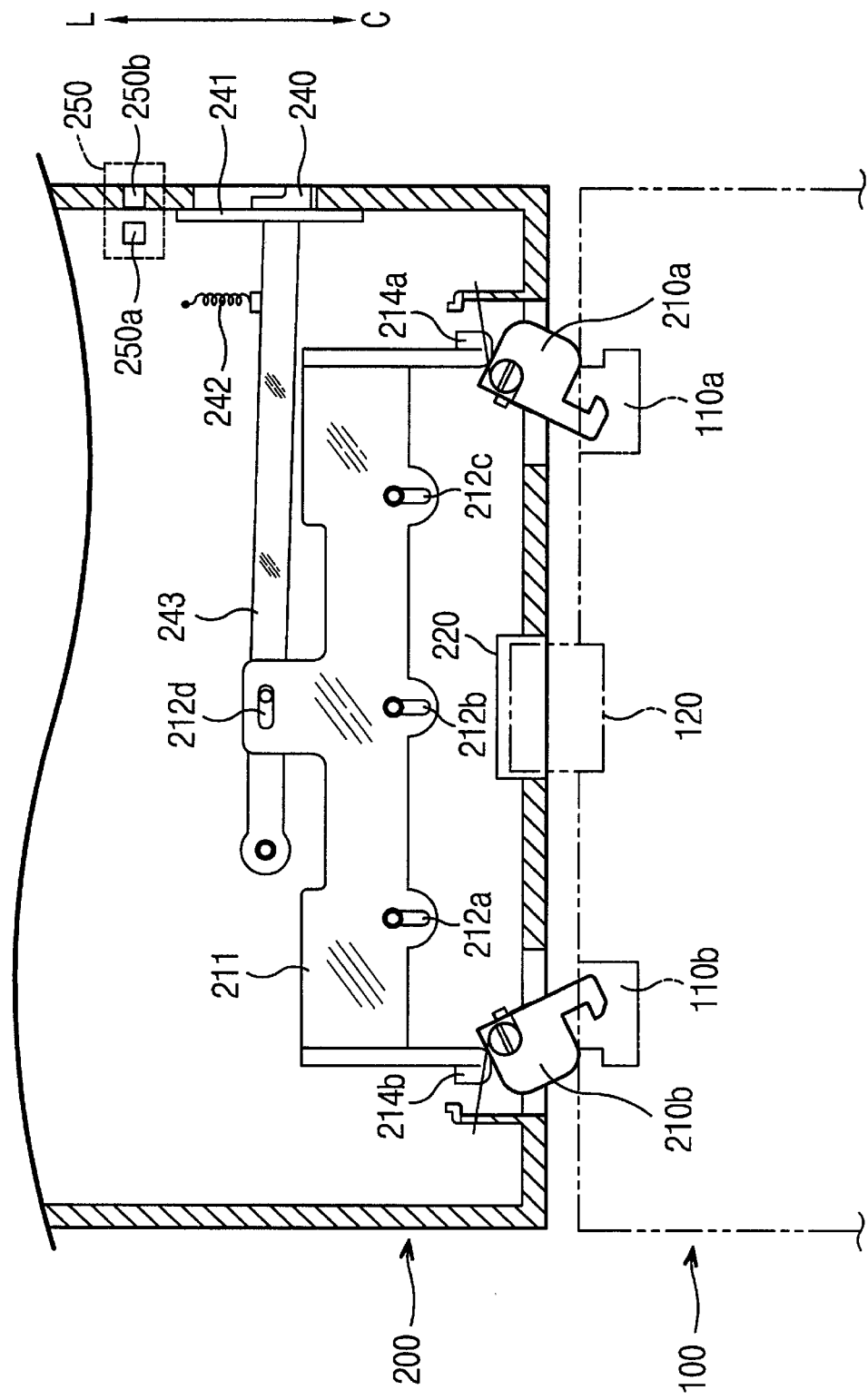
FIG. 3 is a partial sectional view of the docking station of FIG. 2 as taken along line A–A' and illustrating a locking device as constructed in accordance with the present invention.

As shown in FIGS. 2 and 3, the locking device of this invention may be constructed using beam 243, plate 211, and latching members 210a and 210b that are movable mounted in housing 200 of the docking station. Housing 200 may be constructed with an open bottom or a bottom that is fastenably attached after the installation of the connecting device. Top side 39C of housing 200 may be constructed with rectangular body 39 that is formed across the width of the chassis. Housing 200 has tray 34 extending from the front side of rectangular body 39. Tray 34 supports the portable computer while it is engaged with the docking station. Pair of apertures 36 are formed in front side 39A of rectangular body 39 of housing 200. First groove 38 is formed in one of two lateral sides 32 of rectangular body 39.

Beam 243 and plate 211 are installed in housing 200 as follows. Beam 243 is pivotally mounted on the inside of top side 39C of rectangular body 39 of housing 200. Beam 243 is mounted on shaft 53 that fastens onto a boss attached to the top side of housing 200. It should be understood that the rotating shaft of the beam 243 may be constructed by any means that allows beam 243 to rotate about one end. The means used is not critical to the present invention. To receive the shaft 53, one end of beam 243 is perforated to form bore 54, thus having a shaft hole 54. Beam 243 is positioned with second end 52 slightly projected from first groove 38 in a lateral side 39B of housing 200. This allows a user to actuate beam 243 by sliding thumb grip 240. That is, beam 243 can be manually actuated through an angle depending on the length of beam 243 and the length of first groove 38 by a user manipulating the portion of beam 243 that projects outside of housing 200. Thumb grip 240 is linearly movable in first groove 38 by a user to rotate beam 243 around shaft 53. Beam 243 is biased by elastic member 242. The elastic member can be any one of a spring, a hydraulic, and an elastic band. Elastic member 242 biases beam 243 towards the rear side of housing 200.

Expansion plate 241 is mounted inside housing 200 after beam 243. Expansion plate 241 covers first groove 38 to hide the interior of housing 200 from outside viewing. Located on the bottom surface of beam 243 along an approximately central portion is shaft 56 that connects beam 243 to plate 211. Thus, allowing both beam 243 and plate 211 to move in tandem with each other.

Plate 211 is positioned slightly spaced from beam 243 on a side opposite top side 39A of housing 200. Plate 211 has slot 212d located near rear portion 79. Slot 212d is oriented perpendicularly to front side 39A of rectangular body 39. Plate 211 can move in a reciprocating fashion in a direction perpendicular to front side 39A of housing 200. As beam 243 is moved about one end shaft 56 pushes plate 211 towards front side 39A of rectangular body 39. Beam 243 and plate 211 move cooperatively because of the interaction between shaft 56 and slot 212d of the plate. Plate 211 consists of a flat body that has slot 212d located in rear portion 79 and plurality of slots 21a–c at the front portion. Slots 212a–c are preferably spaced out at regular intervals and individually extend in a direction perpendicular to front side 39A of housing 200. Plate 211 is movably mounted to the inside of top side 39C of rectangular body 39 by guide fasteners 80. Fasteners 80 pass through the slots 212a–c of plate 211 prior to being fastened to bosses of the housing 200. At least one, or preferably two, protruding poles 214a–b are provided on flat body 72 of plate 211. Poles 214a–b transmit a linear force from plate 211 to latching member 210a and 210b when plate 211 moves towards front side 39A of housing 200 in cooperation with the motion of beam 243.

Latching members 210a and 210b are arranged in housing 200 at positions that correspond to each of protruding poles 214a–b of plate 211, thus being rotatable by plate 211. When protruding poles 214a–b contact latching members 210a and 210b an eccentrically loaded force causes the latching members to rotate out of the equilibrium position in which they are held by torsional springs. In the preferred embodiment of this invention, two latching members 210a and 210b are arranged in housing 200. The two latching members are also partially projected through apertures 36 located in the front side of the rectangular body of housing 200. Latching members 210a and 210b may be constructed with body 92, latch 94, rotating shaft 98, and torsion spring 98A. Body 92 of latching member 210a and 210b is rotatably mounted to housing 200 via shaft 98. Latching member 210a and 210b can thus secure a portable computer with the docking station by inserting the latches into latch receptacles 110a in the portable computer. Also, latching member 210a and 210b has protrusion 95 that separates the computer from the docking station. To remove the portable computer from the docking station, beam 243 is pushed towards front side 39A of housing 200. Beam 30, which is in contact with plate 211 because shaft 56 is inserted into slot 212d, causes plate 211 to also move towards front side 39A of housing 200. This brings protruding poles 214a–b into contact with latching members 210a and 210b. Prior to contact, the latching members secured a portable computer to the docking station because biasing torsional springs 98A kept the latching members in a locked position, as shown in FIG. 3. Contact between protruding poles 214a–b and latching members 210a and 210b creates an eccentrically loaded force on latching members 210a and 210b that causes latching members 210a and 210b to rotate into an unlock position, as shown in FIG. 3. Latch 94 is integrally formed with body 92 of latching member 210a and 210b and protrudes out through aperture 36 of the chassis over tray 34 that supports the portable computer. Rotating shaft 98 is used to rotatably mount the latching member body 92 to the inside of housing 200. Torsion spring 100 is fitted over rotating shaft 98 to normally bias body 92 of the latching member in a locked position to secure a portable computer to the docking station.

When a portable computer is seated on tray 34, latch 94 of each latching member 210a and 210b is brought into engagement with latching receptacle 112 in the portable computer. This stably holds the portable computer on tray 34. When the thumb grip, also referred to as a knob, 240 of beam 243 is moved by a user, latch 94 is removed from the latch engagement device in the latching receptacle and the portable computer can be removed from tray 34.

When the knob 240 is not being pressed into an unlock position, i.e., towards the front of rectangular body 39, spring 39 biases the locking device into a locked position. The direction of the locked position is denoted L. As such, plate 211 is moved upwardly along with beam 243. Then, latching members 210a, 210b are separated from protruding poles 214a and 214b of plate 211. This causes the latching members to rotate into a mechanically locked position with the portable computer by engaging grooves 110a and 110b in the portable computer.

When the locking device is in the locked, or equilibrium, position, one end of extension plate 241 of knob 240 is moved through the area of photo coupler 250. This causes extension plate 241 to come between photo sensor 250a and light emitting diode 250b. In the lock position, portable computer 100 is mechanically connected to docking station 200 by the engagement of the latching members 210a, 210b with the grooves 110a, 110b, respectively. Notwithstanding, an electrical connection can be made between the interface port 220 of the docking station and expansion port 120 of the portable computer.

Figure 4:
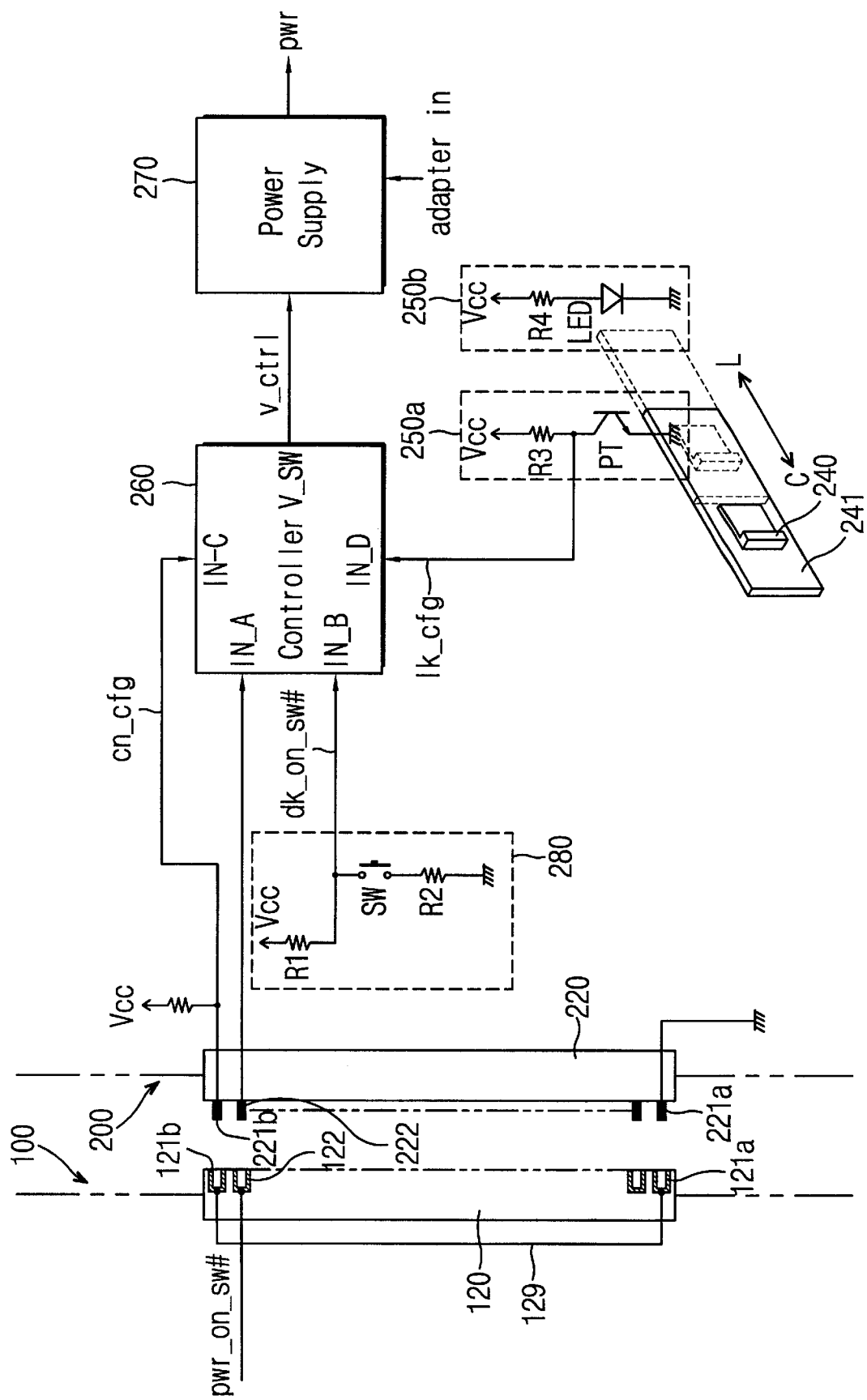
FIG. 4 is a schematic diagram of a diagnostic device as constructed according to the principles of the present invention that is used for detecting the electrical and the mechanical connections between the portable computer and the docking station.

FIG. 4 illustrates a diagnostic device that is also positioned in the docking station in accordance with the principles of the present invention. The diagnostic device includes controller 260 that has input terminal 'IN-C' for sensing a docked-signal 'cn_cfg' fed from a pin 221b of the interface port 220. The pin 221b is connected with another pin 221a of interface port 220 via an electrical circuit that is completed by the portable computer. Pin 221a is preferably electrically grounded. The portable computer has pins 121b and 121a that are connected by a wire and combine with the pins of the docking station to complete a circuit. Pin 221b of the docking station is maintained at a voltage that is dropped to a low level when the circuit is completed. This change from a relatively high voltage level to a low level is interpreted by the controller as a docked-signal.

Controller 260 also has input terminal 'IN-A' for receiving a portable-computer-power-on-signal 'pwr__on__sw#' from pin 122 of the portable computer. The signal is transferred to the docking station via pin 222 of interface port 220. The portable-computer-power-on-signal (pwr__on__sw#) is supplied by a power switch (not shown) of portable computer 100 when the switch is pushed on.

In addition, controller 260 has input terminal 'IN-B' for sensing a docking-station-power-on-signal 'dk__on__sw#' fed from power switch 280 of docking station 200. Usually, power switch 280 includes momentary switch SW, that has one terminal connected to the operating voltage Vcc for generating a high level signal when it is in switch-on state. As such, the controller interprets a high level signal as a docking-station-power-on-signal.

And lastly, controller 260 has input terminal 'IN-D' for sensing a locked-signal 'lk__cfg' that is fed from the output terminal of photo coupler 250. Also, output terminal 'V-SW' is provided in controller 260, that is capable of sending a power-on-signal 'v__ctrl' to a control input of power supply control unit 270 in docking station 200. The power supply control unit 270 switches on or cuts off the power supplied by an AC adapter, in response to the output level of control signal 'v__ctrl'.

In this arrangement, if the operating voltage Vcc supplied from a power adapter via the power supply control unit 270 is applied to each part of the diagnostic device, the docked-signal 'cn__cfg'0 changes its logical level from a high to a low level when interface port 220 and expansion port 120 have been securely coupled to each other. Also, both the portable-computer-power-on-signal 'pwr__on__sw#' and the docking-station-power-on-signal 'dk__on__sw#' are changed from a high logic to a low logic level when the corresponding power switches are switched on. The locked-signal 'lk__cfg' generated by photo coupler 250 changes its logic level from low to high when locking knob 240 of docking station 200 is moved into lock position L and extension plate 241 interrupts photo coupler 250. Furthermore, the power-on-signal 'v__ctrl' output from controller 260 activates power supply control unit 270 to supply power to both the docking station and the portable computer. To stop the supply of power, the controller generates a low-level-control-signal 'v__ctrl'.

Figure 5:
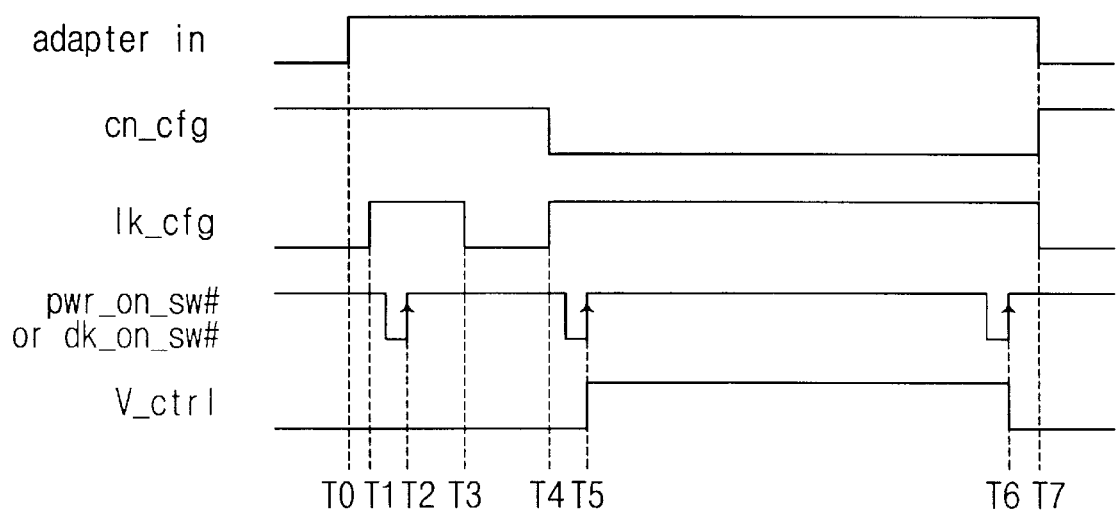
FIG. 5 is a timing diagram illustrating the operation of the controller of FIG. 4 in response to various input.

The operation of controller 260 is better understood with reference to the timing chart of FIG. 5. At time T0, the adapter is supplying power to the power supply unit of the docking station. However, the controller does not generate a power-on-signal 'v__ctrl' and instead maintains a low logic level that causes power supply unit 270 to be deactivated. The controller keeps the power supply turned off because both docked-signal 'cn__cfg' and locked-signal 'lk__cfg' are at logic levels indicating that the portable computer is not electrically or mechanically connected to the docking station. Even if the portable computer were electrically and mechanically connected to the docking station the controller would not activate the power supply because one of portable-computer-power-on-signal 'pwr__on__sw#' and docking-station-power-on-signal 'dk__on__sw#' is not activated. At time T1, although the high logic level indicates a locked-signal 'lk__cfg' is being sent to the controller, the logic level of the power-on-signal 'v__ctrl' is low because the low level docked-signal 'cn__cfg' indicates that there is no secure electrical connection. In addition, one of the portable-computer-power-on-signal 'pwr__on__sw#' and the docking-station-power-on-signal 'dk__on__sw#' have not been activated. At time point T2, one of the portable-computer-power-on-signal 'pwr__on__sw#' and the docking-station-power-on-signal 'dk__on__sw#' is activated with rising edge clocking, but the power-on-signal 'v__ctrl' of controller 260 remains at a low logic level since the high level docked-signal 'cn__cfg' indicates an insecure electrical connection between the portable computer and the docking station. Therefore, at this time, power supply unit 270 is deactivated and the power cannot be supplied to both the docking station and the portable computer.

At time T4, low logic level docked-signal 'cn__cfg' indicates a secure electrical connection between connectors 120 and 220 that is recognized by controller 260. As such, if a high logic level locked-signal 'lk__cfg' is received by the controller, and subsequently at time T5, one of the power switches is pressed and a low level portable-computer-power-on-signal 'pwr__on__sw#' or docking-station-power-on-signal 'dk__on__sw#' is received by controller 260, the power-on-signal 'v__ctrl' of controller 260 will rise to a high logic level causing power supply unit 270 to be activated and thus supplying power to both the docking station and to the portable computer. The controller can be designed to require that both the computer power switch and the docking station be in an on position, or the controller can be designed to require only one power switch to be activated.

During the supply of power, at time T6 one of the power switches is pressed and a low logic level portable-computer-power-on-signal 'pwr__on__sw#' or a low logic level docking-station-power-on-signal on-signal 'dk__on__sw#' is received by the controller. Thus, power-on-signal 'v__ctrl' sent from controller 260 to the power supply will change its level from a high logic level to a low logic level, causing the power supply to deactivate the computer system.

Furthermore, the controller continues to check on the input signals provided during the period that power is being supplied, that is during times period T5 to T6. If any of the electrical connection, the mechanical connection, or the on position of the power switches of both the portable computer and the docking station change, then the controller deactivates the power supply. For example, if knob 240 is moved to release position C, a low level locked-signal 'lk__cfg' is sent to the controller and power-on-signal 'v__ctrl' will change to a low logic level. Thus, power supply unit 270 is deactivated and the power supplied to both the docking station and the portable computer is terminated. Depending on the computer system, when one of the power switches is later pressed, the computer system will be rebooted.

Thus, controller 260 of the diagnostic device produces a power-on-signal 'v__ctrl' of a high logic level that causes power supply control unit 270 to supply power to the docking station and the portable computer only if both the low level docked-signal 'cn__cfg' and high level locked-signal 'lk__cfg' are received by the controller, and one of the portable-computer-power-on-signal 'pwr__on__sw#' and the docking-station-power-on-signal 'dk__on__sw#' is received by controller 260. Furthermore, controller 260 of the diagnostic device produces a low logic level power-on-signal 'v__ctrl' that allows causes power supply control unit 270 to terminate the supply of power whenever either a high logic level docked-signal 'cn_cfg' or a low level locked-signal 'lk_cfg' is received by the controller, and whenever one of the portable-computer-power-on-signal 'pwr_on_sw#' and the docking-station-power-on-signal 'dk_on_sw#' is received by the controller 260.

Figure 6:
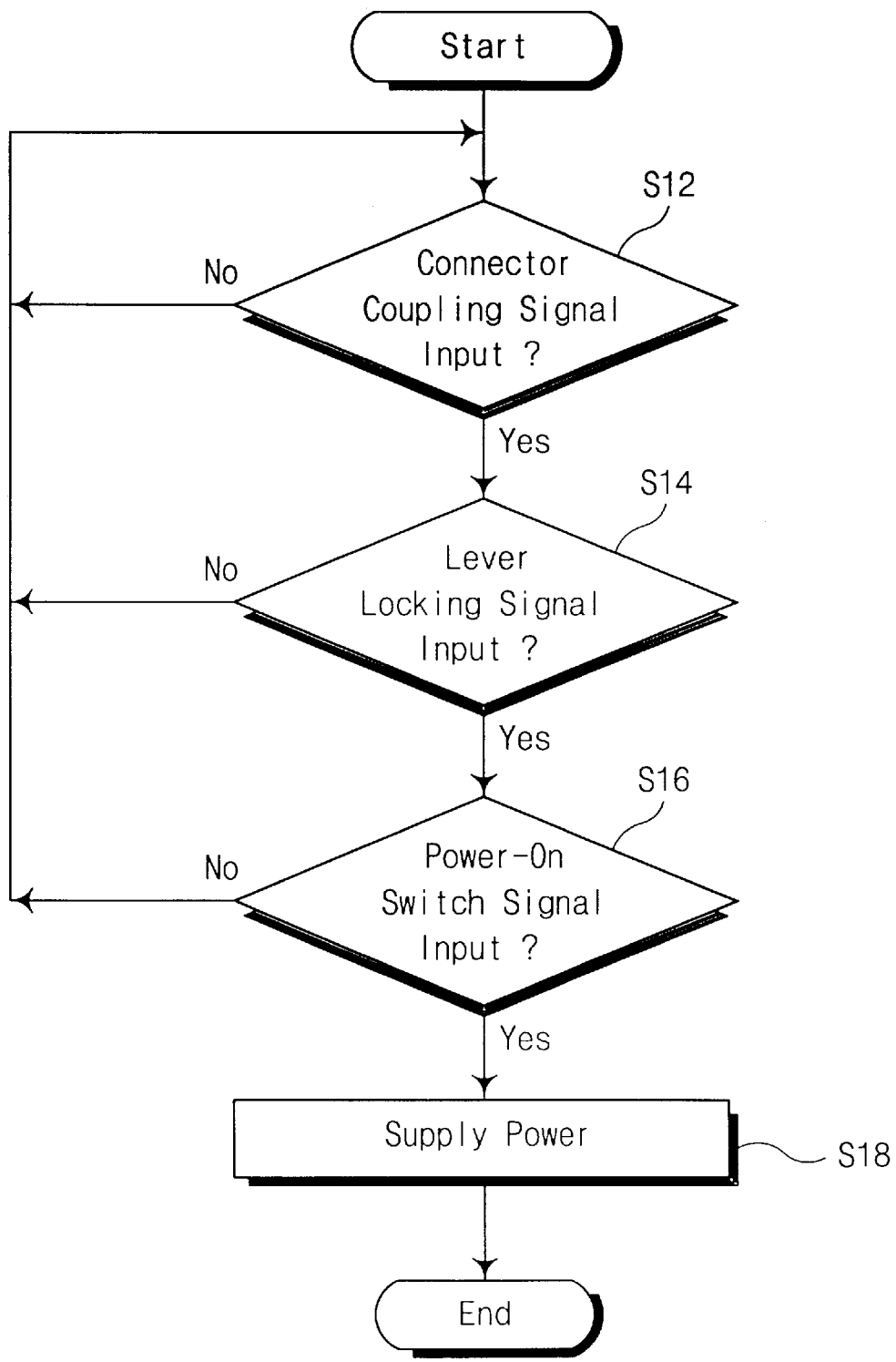
FIG. 6 is a flow chart of a process for initiating the supply of power in accordance with the principles of the present invention, as performed by the controller of FIG. 4.

As shown in flow chart of FIG. 6, the controller 260 of the diagnostic device checks the electrical connection in step S 12. Then, in step S 14, the controller checks the mechanical connection between the docking station and portable computer before initiating supply of power. And then, in step S16 the controller determines whether both of the power switches are pressed by checking to ensure that a low level logic portable-computer-power-on-signal 'pwr_on_sw#' and that a low level logic docking-station-power-on-signal 'dk_on_sw#' is being received. If all of the steps result in positive results, then the supply of power is initiated during step S18 by producing high logic level power-on-signal 'v_ctrl'.

Figure 7:
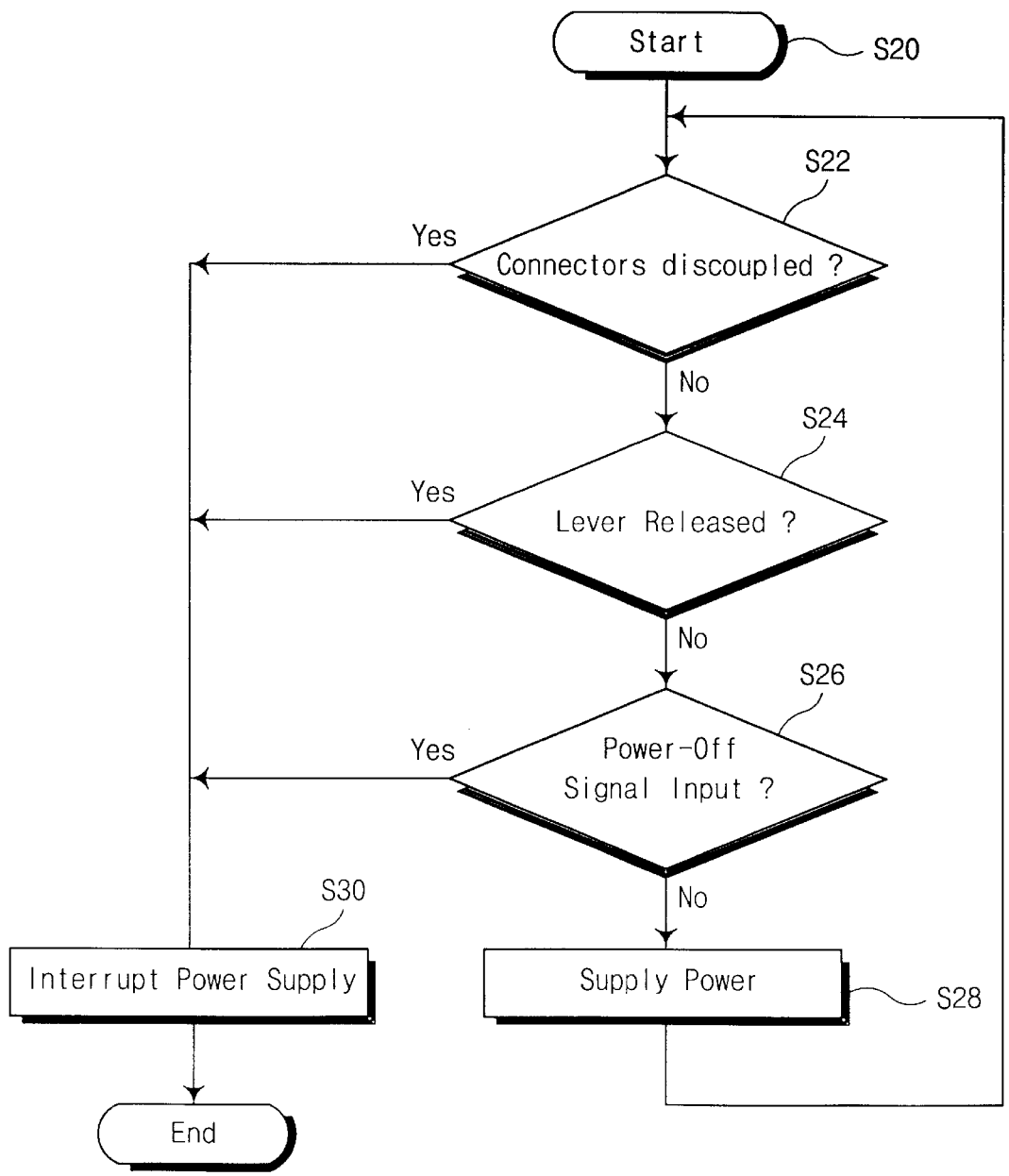
FIG. 7 is a flow chart of a diagnostic operation, performed while supplying power to the portable computer, to determine whether the power supply should be turned off.

As detailed in the flow chart illustrated in FIG. 7, the controller continues to check the status of both the docking station and the portable computer during any periods that the power supply is supplying power to both the docking station and the portable computer. In step S22 the controller ensures that the electrical connection is still secure. Then, during step S24, the controller ensures that the mechanical connection between the portable computer and the docking station is secure by checking to see if a high level docked-signal 'cn_cfg' is being received. If the high level docked-signal 'cn_cfg' is no longer being received, then the controller directs the power supply to cease. Next, during step S26 the controller determines whether a power switch has been deactivated by checking for a high level portable-computer-power-on-signal 'pwr_on_sw#' or a high level docking-station-power-on-signal 'dk_on_sw#'. If both switches are still in an on position, then the controller continues the power supply. If any of the connections are insecure or if any of the power switches are turned off then the controller causes the power supply unit to cease the supply of power.

As described above, according to the diagnostic device of this invention, the checking of the electrical and mechanical connections between a docking station and a portable computer is possible before initiating the supply of power, and during the power supply, the diagnostic device continues to check both the electrical and mechanical connection status. If the electrical connection between the connectors is found insecure, or if the locking device is at the release position, the power supplied to both the portable computer as well as the docking station is interrupted.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A docking station for a portable computer, said docking station comprising:
    a housing comprising:
        a body having a substantially rectangular shape, two lateral sides, and a front;
        an interface port supported by said body for interfacing with said portable computer;
        a tray attached to said body and extending from said front side to support said portable computer while said portable computer is interfaced with said docking station; and
        a plurality of peripheral ports supported by said body for interfacing with a peripheral device;
    a power supply for said docking station;
    a controller regulating said power supply;
    means for said controller to detect a docked-signal indicating an electrical connection with said portable computer;
    a locking means for mechanically securing said portable computer to said docking station;
    a photo-sensor for sending a locked-signal to said controller while said portable computer is mechanically secured to said docking station;
    means for said controller to receive a portable-computer-power-on-signal from said portable computer when a power switch for said portable computer is turned on;
    means for sending a docking-station-power-on-signal to said controller when a power switch for said docking station is turned on; and
    said controller activating said power supply to both said docking station and said portable computer while said docking-signal is being received, said locked-signal is being received, said portable-computer-power-on-signal is being received, and said docking-station-power-on-signal is being received, thus said controller causes said power supply to power said docking station and said portable computer while said portable computer is both electrically and mechanically connected to said docking station and both said power switch for said portable computer and said power switch for said docking station is activated.

2. The docking station of claim 1, with said locking means comprising:
    said housing further comprising:
        a first groove located in one of said two lateral sides; and
        two apertures in said front side of said body;
    a beam pivotally connected at one end to an inner surface of said top side of said housing, said beam comprising:
        a second end both protruding through and slidably engaged with said first groove in said housing;
        a shaft extending towards said bottom side of said housing; and
        an elastic member biasing said second end towards said rear side of said housing;
    a plate slidably and fastenably connected to said inner surface of said top side of said housing, said plate comprising:
        a plurality of slots oriented substantially perpendicularly to said front side of said housing, said slots slidable along a plurality of fasteners each penetrating one of said slots and each fastened to said inner surface of said top side of said housing;
        a second groove oriented substantially parallel to said front side of said housing and slidably engaging said shaft of said beam, said shaft penetrating said second groove to connect said plate to said beam; and
        two protruding poles extending from said plate towards said front side of said housing;
    two latching members pivotally mounted on said inner surface of said top side of said housing, each of said two latching members comprising:
        a latch protruding through one of said two apertures in said housing and being engageable with said portable computer; and a torsional spring biasing one of said two latching members into an equilibrium position securing said portable computer to said housing; and said second end of said beam being slidable towards said front side of said housing to slide said plate and bring said two protruding poles into eccentric contact with said two latching members and to rotate said two latching members into a position releasing said portable computer from said docking station.

3. The docking station of claim 2, further comprising:

a first pin positioned on said docking station proximate one side of said interface port and supplied with an operating voltage; and a second pin positioned on said docking station proximate to said interface port and electrically grounded.

4. The docking station of claim 3, with said portable computer further comprising:

a third pin engageable with said first pin on said docking station;

a fourth pin engageable with said second pin on said docking station; and a jumper wire connecting said third pin to said fourth pin.

5. The docking station of claim 2, further comprising a boss located on said inner surface of said top side of said housing for securing said beam in a pivotal manner.

6. The docking station of claim 5, further comprising a plurality of bosses located on said inner surface of said top side of said housing for engaging said fasteners slidably securing said plate to said housing.

7. The docking station of claim 6, further comprised of said beam having a plate attached at said second end slidable contacting one of said two lateral sides.

8. The docking station of claim 7, further comprising said two latching members each having a plug mounted near said latch to push said portable computer away from said docking station when said two latching members are moved into said position releasing said portable computer.

9. An apparatus for regulating the power supplied by a docking station, said apparatus comprising:

a housing comprising:
a body having a substantially rectangular shape, and a front side;
an interface port supported by said body for interfacing with said portable computer;
a tray attached to said body and extending from said front side to support said portable computer while said portable computer is interfaced with said docking station;
a plurality of peripheral ports supported by said body for interfacing with a peripheral device;
a first pin positioned on said docking station proximate one side of said interface port and supplied with an operating voltage; and
a second pin positioned on said docking station proximate to said interface port and electrically grounded;

a power supply for said docking station;

a controller regulating said power supply;

means for said controller to detect a docked-signal indicating an electrical connection with said portable computer;

a locking means for mechanically securing said portable computer to said docking station;

a photo-sensor for sending a locked-signal to said controller while said portable computer is mechanically secured to said docking station;

means for said controller to receive a portable-computer-power-on-signal from said portable computer when a power switch for said portable computer is turned on;

means for sending a docking-station-power-on-signal to said controller when a power switch for said docking station is turned on; and said controller activating said power supply to both said docking station and said portable computer while said docking-signal is being received, said locked-signal is being received, said portable-computer-power-on-signal is being received, and said docking-station-power-on-signal is being received, thus said controller causes said power supply to power said docking station and said portable computer while said portable computer is both electrically and mechanically connected to said docking station and both said power switch for said portable computer and said power switch for said docking station is activated.

10. The apparatus of claim 9, with said portable computer further comprising:

a third pin engageable with said first pin on said docking station;

a fourth pin engageable with said second pin on said docking station; and a jumper wire connecting said third pin to said fourth pin.

11. A method of regulating the power supplied from a docking station to a portable computer, wherein said portable computer is electrically connectable via an interface port and mechanically connectable via a locking device to said docking station, said method comprising the steps of:

making a first determination of whether a secure electrical connection exists between said portable computer and said docking station by generating a docking-signal when a signal loop exists between said portable computer and said docking station when said portable computer is electrically engaged with said docking station;

making a second determination of whether said locking device is in a locked position by generating a locked-signal when a secure mechanical connection exists;

making a third determination of whether either one of a portable computer power switch or a docking station power switch is activated by checking for either one of a portable-computer-power-on-signal and a docking-station-power-on-signal; and allowing a power supply unit disposed in said docking station to supply said power from said docking station to said portable computer in accordance with said first, second, third determinations.

12. The method as claimed in claim 11, further comprised of the steps of:

determining, during a time interval when power is being supplied to said portable computer, whether said docking signal is interrupted, thus indicating an insecure electrical connection between said portable computer and said docking station;

determining, during a time interval when power is being supplied to said portable computer, whether said locked-signal is interrupted, thus indicating an insecure mechanical connection;

determining whether a power-off-switch-signal is generated by either said docking station or said portable computer; and stopping the power supplied to said portable computer and said docking station when any of the previous steps is in a positive condition.

13. The method of claim 12, with said docking station further comprising:
- a housing comprising:
  - a body having a substantially rectangular shape, a bottom side, a top side, two lateral sides, a front side, and a rear side;
  - a first groove located in one of said two lateral sides;
  - an interface port supported by said body for interfacing with said portable computer;
  - a tray attached to said body and extending from said front side to support said portable computer while said portable computer is interfaced with said docking station;
  - two apertures in said front side of said body; and
  - a plurality of peripheral ports supported by said body for interfacing with a peripheral device;
- a beam pivotally connected at one end to an inner surface of said top side of said housing, said beam comprising:
  - a second end both protruding through and slidably engaged with said first groove in said housing;
  - a shaft extending towards said bottom side of said housing; and
  - an elastic member biasing said second end towards said rear side of said housing;
- a plate slidably and fastenably connected to said inner surface of said top side of said housing, said plate comprising:
  - a plurality of slots oriented substantially perpendicularly to said front side of said housing, said slots slidable along a plurality of fasteners each penetrating one of said slots and each fastened to said inner surface of said top side of said housing;
  - a second groove oriented substantially parallel to said front side of said housing and slidably engaging said shaft of said beam, said shaft penetrating said second groove to connect said plate to said beam; and
  - two protruding poles extending from said plate towards said front side of said housing;
- two latching members pivotally mounted on said inner surface of said top side of said housing, each of said two latching members comprising:
  - a latch protruding through one of said two apertures in said housing and being engageable with said portable computer; and
  - a torsional spring biasing one of said two latching members into an equilibrium position securing said portable computer to said housing; and
- said second end of said beam being slidable towards said front side of said housing to slide said plate and bring said two protruding poles into eccentric contact with said two latching members and to rotate said two latching members into a position releasing said portable computer from said docking station.

14. The method of claim 11, further comprised of the step of making a fourth determination of whether said docking signal is interrupted during a time interval when said power is being supplied to said portable computer, thereby indicating an insecure electrical connection between said portable computer and said docking station.

15. The method of claim 14, further comprised of the step terminating said power to be supplied to said portable computer in accordance with said fourth determination.

16. The method of claim 11, further comprised of the step of making a fourth determination of whether said locked-signal is interrupted during a time interval when power is being supplied to said portable computer, thereby indicating an insecure mechanical connection.

17. The method of claim 16, further comprised of the step of terminating said power to be supplied to said portable computer in accordance with said fourth determination.

18. A docking station for a portable computer, comprising:
- a power supply unit disposed in said docking station;
- a controller disposed in said docking station, regulating said power supply unit;
- a locking mechanism mechanically securing said portable computer to said docking station;
- a first detector disposed to detect a locking state of said locking mechanism and to generate a locking signal when said locking state indicates said portable computer is mechanically secured to said docking station;
- a first electrical connector disposed in said docking station;
- a second electrical connector, disposed in said portable computer, to be connected to said first electrical connector;
- a second detector disposed to detect a connecting state of said first and second electrical connectors and to generate a connecting signal when said connecting state indicates said first electrical connector of said docking station is electrically connected to said second electrical connector of said portable computer; and
- a said controller allowing said power supply unit to supply power to said portable computer in accordance with said locking signal and said connecting signal.

19. The docking station of claim 18, further comprised of:
- a power switch disposed in one of said docking station and said portable computer to generate a switching signal when said power switch is on; and
- said controller allowing said power supply unit to supply power to said portable computer in accordance with said switching signal.

20. The docking station of claim 18, further comprised of:
- a first pin located on one end of said first electrical connecter;
- a second pin located on one end of said second electrical connector to be connected to said first pin;
- a third pin located on another end of said first electrical connector;
- a fourth pin located on another end of said second electrical connector of said docking station, connected to said third pin;
- said second pin connected to said fourth pin of said second connector; and
- said controller monitoring said connecting signal generated from said second detector, said connecting signal being generated when said first pin is connected to said second pin and that said third pin is connected to said fourth pin.

* * * * *